(12) United States Patent
Gritton et al.

(10) Patent No.: US 6,562,241 B1
(45) Date of Patent: May 13, 2003

(54) METHODS FOR NEGATIVE ATMOSPHERIC PRESSURE REMOVAL OF ARSENIC AND OTHER METALS

(75) Inventors: Kenneth S. Gritton, Murray, UT (US); Mark Bondiett, Sandy, UT (US)

(73) Assignee: Watermark Technologies, LLC, Sandy, UT (US)

( * ) Notice: Subject to any disclaimer, the term of this patent is extended or adjusted under 35 U.S.C. 154(b) by 4 days.

(21) Appl. No.: 09/709,876

(22) Filed: Nov. 10, 2000

(51) Int. Cl.[7] .................................................. C02F 1/58
(52) U.S. Cl. ........................ 210/721; 210/738; 210/748; 210/808; 210/911; 210/912
(58) Field of Search ................................ 210/705, 712, 210/718, 721, 738, 748, 758, 808, 911, 912; 159/47.3

(56) References Cited

U.S. PATENT DOCUMENTS

| | | | | |
|---|---|---|---|---|
| 3,837,491 A | * | 9/1974 | Humiston et al. | 202/236 |
| 4,203,837 A | * | 5/1980 | Hoge et al. | 209/166 |
| 4,241,039 A | * | 12/1980 | Koh et al. | 423/531 |
| 4,340,487 A | * | 7/1982 | Lyon | 210/705 |
| 4,844,873 A | * | 7/1989 | Lebon et al. | 209/166 |
| 4,913,771 A | * | 4/1990 | McIntyre | 137/895 |
| 5,348,662 A | * | 9/1994 | Yen et al. | 210/717 |
| 5,679,257 A | * | 10/1997 | Coate et al. | 204/554 |
| 5,904,855 A | * | 5/1999 | Manz et al. | 210/112 |
| 6,398,968 B1 | * | 6/2002 | Hibby | 210/721 |

\* cited by examiner

*Primary Examiner*—Peter A. Hruskoci
(74) *Attorney, Agent, or Firm*—Kirton & McConkie; Michael E. Krieger

(57) ABSTRACT

The methods and apparatus of embodiments of the present invention serve to precipitate dissolved inorganic arsenic from an aqueous solution. The pressurization/negative pressurization protocol promotes precipitation of dissolved inorganic arsenic. After pressurization/negative pressurization method is applied the newly created precipitates may be separated from the solution using known separation methods. Aeration of the solution prior to or during pressurization and addition of chemical oxidants and air injection prior to or during pressurization aid precipitation. The methods of embodiments of the present invention may be applied to batch-process and continuous, in-flow apparatus.

9 Claims, 5 Drawing Sheets

METHODS FOR NEGATIVE ATMOSPHERIC PRESSURE REMOVAL OF ARSENIC AND OTHER METALS

BACKGROUND

1. The Field of the Invention

The present invention relates to methods and apparatus for removing arsenic contaminants from water. More particularly, embodiments of the present invention create conditions that remove arsenic contaminants from anoxic or oxic water using continuous in-stream and batch process methods at atmospheric or above-atmospheric solution pressures followed by negative pressurization of the solution. Negative solution pressurization within the treatment sequence rapidly and surprisingly increases particulation and reduces aqueous concentrations of arsenic.

2. Background

Domestic water supplies often come from underground aquifers which contain anoxic water that has leached through and otherwise contacted minerals, sediments and rock layers for extended periods of time. These minerals, sediments and rocks often contain high concentrations of minerals, metals and other elements and compounds that are deleterious to human health. As a consequence of this contact, water in these aquifers becomes contaminated with some of the indigenous contaminants rendering the water unsafe for human consumption. Other water sources that may be used for domestic water supplies may also become contaminated with metallic ions and other contaminants through industrial pollution and other processes. These contaminated waters, prior to human consumption, will require remediation treatments.

Arsenic is one element that is often found in water sources and is pathological, in terms of human health of specific population segments, at all levels of concentration in drinking water concentrations. Several methods are known for removing arsenic species from water, however each has limitations and or disadvantages, which make embodiments of the present invention preferable in many applications.

Methods using electrolytic cells for electrochemical insolubilization of metallic ions using sacrificial anodes are known for arsenic removal, but require an energy source to power the electrolytic cell and do not address the issue of removing dissolved inorganic arsenic III species.

Other known methods require significant changes in pH levels to the bulk solution to effectuate precipitation of arsenic species from solution (i.e. lime addition). These processes additionally require a readjustment of the pH level after treatment to near neutral conditions. These two requirements are chemically intensive and equipment intensive. Another method requires ultra-filtration and the addition of anti-scalants as pre-treatments for reverse osmosis treatment systems that remove arsenic species. This treatment method is ineffectual in terms of removing dissolved inorganic arsenic III species without chemical oxidation, which in turn is deleterious to the systems membranes. Other methods utilize adsorptive materials that are rapidly consumed and become solid waste along with the regenerative solutions required by the system (i.e. active alumina, ion exchange). Reverse osmosis removes arsenic As(III) and AS(v) species with out the addition of oxidants but systems employing reverse osmosis have high capital and operating costs as well as loss through rejection of a significant percentage of the inlet water.

In some instances, a treatment method will efficiently remove dissolved arsenic species from a specific water source but be far less efficient when the same operational parameters are applied at a second autonomous water source. In particular, inconsistency of performance capabilities of the iron coagulation treatment system is problematic.

To achieve efficiency with nearly all anoxic ground water sources this method often requires large additions of either ferric chloride or ferric sulfate to the bulk solution. Some of these water sources require the addition of nearly 40-mg of ferric chloride per liter of treated water to achieve a residual arsenic level less than 5 parts per billion. This chemically intensive practice of adding voluminous ferric chloride solutions results in a significant pH shift in the bulk solution towards the acid region. To counter the acid shift, the treatment facility is engineered to add base solutions to the bulk solution causing a return of the bulk solution pH to near neutral conditions. After physical separation of the newly created particulate matter from the bulk solution the resulting accumulation of solid waste is massive, which in its self is problematic in terms of disposal requirements.

Many known methods of arsenic removal also fail to reduce arsenic concentrations to acceptable levels. Some methods only reduce arsenic concentration to a level of approximately 50 parts per billion. This may meet some current standards, however standards are likely to become more stringent in the future rendering these methods obsolete and unusable for purifying drinking water. Furthermore, the increased protection provided by methods that significantly reduce contaminant levels in drinking waters is a benefit to consumers as well as water suppliers.

Most of these methods are overly complex, labor intensive, produce large waste streams, require large facilities and land, are expensive and require the addition of large quantities of various chemicals for precipitation and pH adjustment.

Another prior art method provides for the removal or reduction of dissolved inorganic arsenic and other metals in anoxic or oxic aqueous solutions treated by the addition of iron salts to the solution.

The prior art method teaches that pressurization prepares dissolved inorganic arsenic III species to become particulate during the subsequent depressurization and ambient reaction. The pressurization step of this prior art treatment method lasts for a short duration of time (less than 5 minutes) followed by a depressurization step to near ambient pressures. The depressurized aqueous solution may reside in an ambient pressure reaction vessel or conduit in a quiescent state (batch process) or free-flowing state (continuous in-stream) for a short period of time (less than 5 minutes) prior to physical separation. Particulate and precipitated arsenic-containing solids are stabilized and are then separated from the solution by pressure filtration, sedimentation or other solid-liquid separation methods.

Arsenic removal efficiencies for this prior art method, based upon efficient filtration capabilities for physically removing particulate matter at 5 micron in size and greater, are such that final effluent concentrations are typically less than 2 parts per billion (ppb) arsenic. During continuous in-flow processes, pressurization may be achieved by pumping the solution into a pressure tank or by utilizing the head pressure of pumps associated with ground water sources to pump directly into pressure tanks. An inverted siphon or discharge into a tank of sufficient depth to achieve the desired pressure are other methods of achieving pressurization during in-flow processes.

SUMMARY AND OBJECTS OF THE INVENTION

The present invention is directed toward a method for the removal of arsenic and other metals from an aqueous solution. The solution may be pressurized by filling a tank followed by pressurization by electric pump or other means. After a short reaction time under pressure has elapsed, the solution is then depressurized to ambient pressure and then further depressurized to negative pressure (below ambient) to allow for the final particulation reactions to occur. In a small-scale operation, pressurization and evacuation may be achieved by the use of a hand pump. Pressurization levels between 10 psi and 120 psi have been found to significantly reduce both dissolved inorganic arsenic V & III species levels in anoxic and oxic aqueous solutions, however pressures between about 30 psi and about 60 psi are preferred for solutions with average arsenic contamination. Negative pressurization levels occur in the range of 0 to 25 in.Hg of vacuum, more preferably in the range of 10–20, in.Hg of vacuum. Accordingly, reaction velocities involving the particulation of the dissolved inorganic arsenic species is dependent upon the pressures applied during the pressurization and depressurization steps. The greater the initial pressure utilized the greater the reaction kinetics and the greater the negative pressure utilized in depressurization, the greater the final particulation, where such pressures are within the ranges disclosed.

The processes of the present invention may be advantageously used for emergency water treatment in small, hand-pumped, pressure tanks. Likewise, these methods may be used for large-scale water treatment operations where hundreds of cubic feet per minute are treated. Surprisingly, it appears that elevated pressurization and subsequent negative depressurization of the treated aqueous solution improves the precipitation-and-stabilization reaction compared to treatment sequence involving pressure as an initial condition followed by depressurization to ambient pressure alone or within a treatment sequence including ambient pressure as an initial condition followed by pressurization then followed by depressurization to ambient pressure.

Accordingly, it is an object of some embodiments of the present invention to provide improved methods and apparatus for reducing the concentration of arsenic species in an aqueous solution.

It is also an object of some embodiments of the present invention to provide methods and apparatus for improving the quality and potability of a water supply.

Another object of some embodiments of the present invention is to provide methods and apparatus to improve continuous in-stream reduction of the concentration of dissolved inorganic arsenic in an anoxic or oxic aqueous solution.

A further object of some embodiments of the present invention is to provide methods and apparatus for batch-process to improve the reduction of the concentration of dissolved inorganic arsenic in an anoxic or oxic aqueous solution.

These and other objects and features of the present invention will become more fully apparent from the following, description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the system and apparatus of the present invention, as represented in FIGS. 1 through 5, is not intended to limit the scope of the invention, as claimed, but it is merely representative of the presently preferred embodiments of the invention.

The currently preferred embodiments of the present invention will be best understood by reference to the drawings, wherein like parts are designated by like numerals throughout.

The removal of dissolved inorganic arsenic from varying water sources by subjecting the aqueous solution to negative pressure from initial ambient or positive pressure is an effective removal method that has yielded treated waters containing a little more than two parts per billion residual arsenic. The methods and apparatus of preferred embodiments of the present invention may be used to reduce or remove arsenic species from anoxic or oxic aqueous solutions from many sources. The terms "water" and "aqueous solution" may be used interchangeably to designate dilute streams of water with arsenic contaminants.

Dissolved inorganic arsenic is predominantly found in anoxic aqueous solutions in the form of As(III) and oxic aqueous solutions as As(V) species. To efficiently achieve the lowest concentrations of dissolved inorganic arsenic species in treated solutions, both species must be treated so as to cause them to become particulate. This in turn allows for ease of physical separation from the bulk solution while achieving a significant reduction in residual arsenic in the same. To achieve further reduced arsenic concentrations, the methods of embodiments of the present invention utilize negative pressurization of the solution in various processes.

As an example of one embodiment of the method of the present invention, a solution containing 10 parts per billion of arsenic is treated using negative pressure. Using a mixing vessel, the preparation containing water with 10 parts per billion of arsenic is prepared. The contaminated water was pumped into and subjected to a negative pressure in the range between 0 and 25 inches of mercury. As the contaminated water was pumped into the separation vessel, the aqueous solution came under strong vacuum in the separation vessel, reducing the concentration of arsenic in the aqueous solution. Results indicate that at 10 inches of mercury of vacuum, approximately 10 ppb of arsenic remained in the aqueous solution. At 15 in.Hg vacuum, less than seven parts were billion of arsenic were detected in the water. At just under 20 inches of mercury, a little more than two parts per billion of the arsenic was detected in water.

Figure 4:
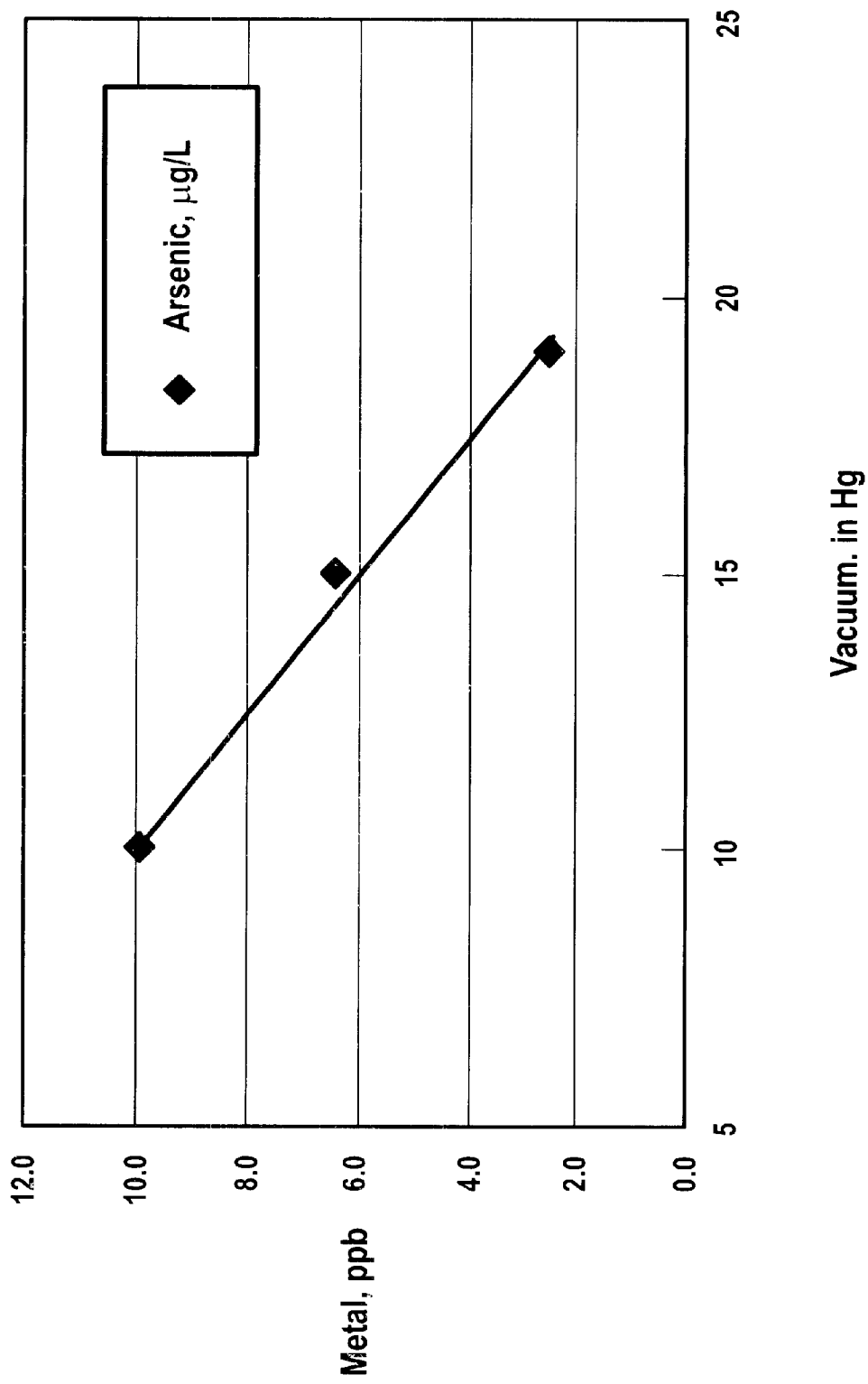
FIG. 4 is a graph showing arsenic concentrations versus time for a sample treated by a method of the present invention.

The results of this example are shown in FIG. 4. As illustrated by FIG. 4, there is a strong correlation between increasing vacuum and the decrease in concentration of arsenic in the water. Based upon these results, is clear that this process can be used to effectively remove arsenic from contaminated water.

Figure 1:
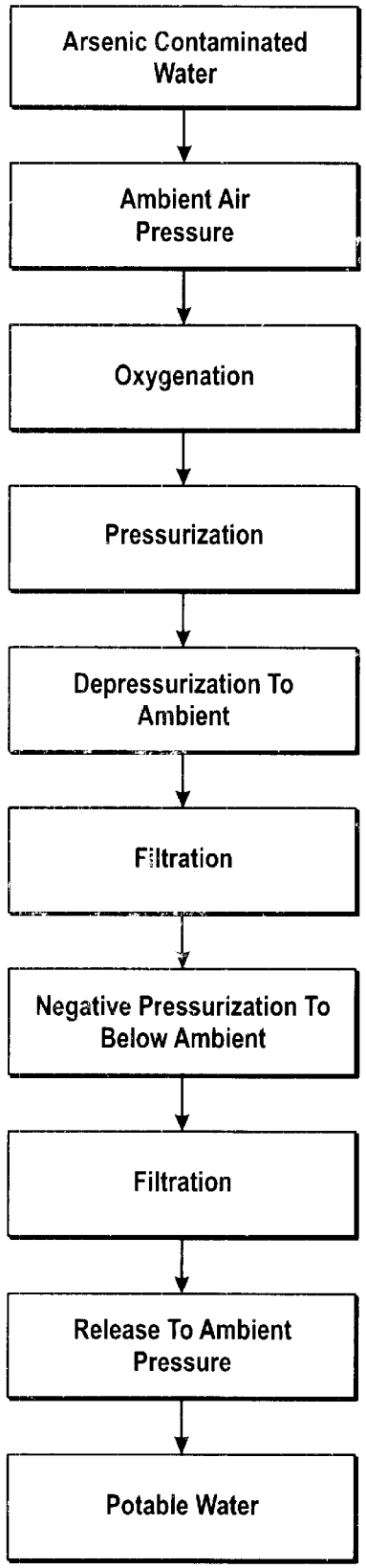
FIG. 1 is a flow chart showing the steps of a preferred method of the present invention.

In reference to FIG. 1, a preferred process of the present invention is illustrated in flow chart form showing optional depressurization procedures. Water contaminated predominantly with dissolved inorganic arsenic enters an apparatus of the present invention from a well, reservoir, holding pond, river, factory effluent, or any other source of water or aqueous solution. Treatment of the contaminated aqueous solution begins at ambient pressure. Systems that have pressurized the solution before arrival at the treatment location, for example in pressurized piping, may output to an ambient holding tank or other vessel that allows depressurization to ambient conditions.

Once ambient conditions are attained, the solution is oxygenated which, at this point, may be achieved through aeration or through the addition of a chemical oxidant. Air pumps or other means may be employed to force one or more streams of air into the solution for aeration. Agitation methods may also be used. Air pressure and volume should be sufficient to "super-aerate" the solution such that the average dissolved concentration of oxygen exceeds that which may be obtained under quiescent, ambient conditions. Under quiescent, ambient conditions the oxygen to solution ratio may approach approximately 8 mg. per liter of solution, however, this value may be temporarily exceeded with sufficient aeration quantities and pressure.

Pressures of about 10 psi to about 120 psi have been found to be adequate to promote insolubilization of arsenic species. Higher pressures promote quicker reactions and more complete reactions. While higher pressures can be beneficial, pressures of about 30 psi to about 45 psi are sufficient and preferred for typical potable water solutions with typical dissolved inorganic arsenic concentrations. This preferred pressure range provides excellent arsenic concentration reduction without the expense of excess pressurization. Pressurization may be achieved by pumping the solution against a pressure valve, orifice, filter or any other known techniques. A pressure tank may be used in this process, however, a tank is not needed so long as the pressure is elevated to the prescribed level. Other methods may also be used to increase solution pressure. When pumping power is not available or uneconomical for an in-flow process, an inverted siphon, water tower or other means will suffice. For a batch process, a pump may also be used to increase pressure. Small batch process methods, especially those used for small scale emergency treatment of water, may even use hand pump pressurization.

Pressurization need not be maintained for sustained periods. Instantaneous pressurization may be sufficient to achieve many concentration reduction levels. In a preferred embodiment, pressurization is maintained for 5 minutes or more to ensure that adequate amounts of arsenic will be precipitated and stabilized. Longer pressurization periods are not thought to significantly affect the process.

After the solution has been pressurized and the arsenic species have been precipitated, the arsenic species may be removed through common separation techniques. Conventional pressure and gravity filtration methods, sedimentation, centrifugation and other separation methods are all adequate for separation of the precipitates so long as they remove the size of particles generated in the precipitation process. The mean particle size is thought to be about 6 microns. In a preferred embodiment of the present invention, a five-micron rated filter, Such as a pressurized granular-media filter, is used to remove precipitate solids in a continuous in-flow process.

A return to ambient pressure conditions may occur either before or after separation of the precipitate. Some methods of the present invention may use a pressure filter through which the treated solution is forced. With some filters, adequate flow rates may only be maintained when sufficient pressure is developed against the filter. These methods will, obviously, filter the precipitate before or during depressurization to ambient pressures. Other separation methods may require a return to ambient conditions before separation of the precipitate, these include, but are not limited to clarifier ponds, mechanical clarifiers and other methods. Either method is adequate for removal of the precipitate so long as proper precautions are taken. When filtration occurs after return to ambient pressure, the pressure should be maintained for a period of 5 minutes or more to ensure stabilization of the precipitated species. Pressurization for at least 5 minutes is thought to be a prudent precaution for most embodiments of the methods of the present invention. In a specific application, simple testing will reveal the necessity for maintaining pressure and the optimal period of time required.

Negative pressures between 0 and 25 inches of mercury vacuum have been found to be sufficient for reducing the concentration of dissolved arsenic and the aqueous solution. More moderate vacuum levels between 10 and 20 inches of mercury have also been found to be effective. The preferred range may prove to be more economical than attempting to maintain a strong vacuum over the aqueous solution. As with pressurization, a pressure tank may be used to create negative pressure, but is not necessary so long as the negative pressure remains at the prescribed level. The negative pressure can be provided from vacuum pumps or any other method for creating negative pressure known in the art. Such methods could include but are not limited to techniques used in evacuative degassing to create the below ambient pressure. On a smaller scale, manually operated vacuum pumps may be employed where necessary. Sustained negative pressure pressurization is not necessary to achieve a reduction in concentration levels, but preferably the solution is exposed to the negative pressure for about 1 to 5 minutes.

Once the precipitates have been separated, the solution is fully treated and the arsenic levels are reduced to an acceptable level. In many applications, this concentration level will be less than 5 ppb, well below most current standards.

Figure 2:
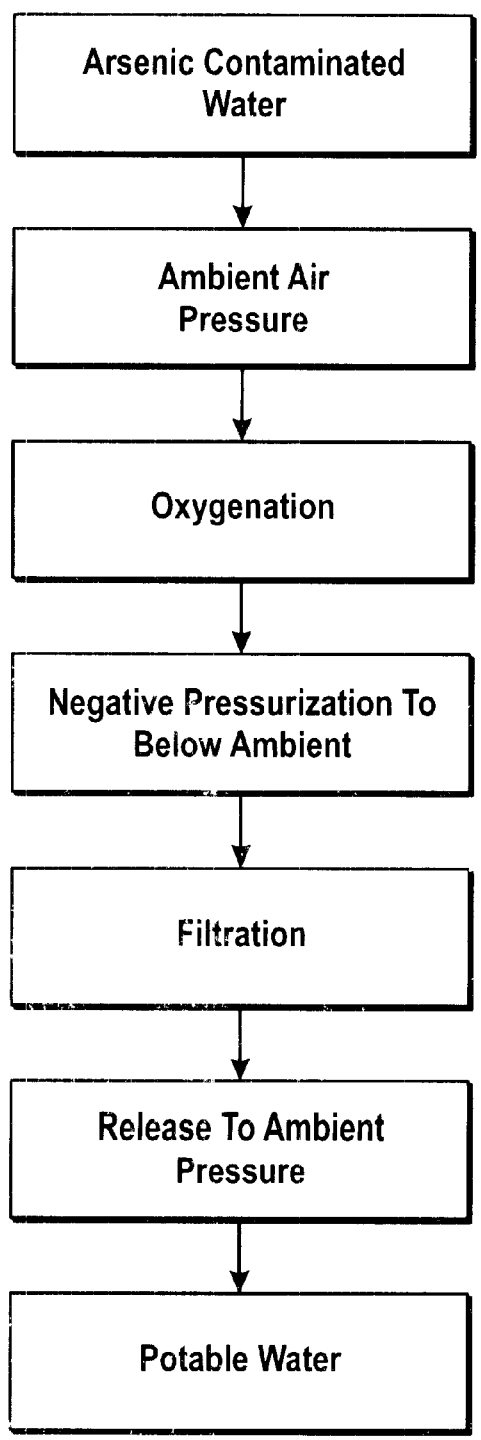
FIG. 2 is a flow chart showing the steps of another preferred method of the present invention.

FIG. 2 shows a flow chart of one embodiment of the process of the present invention. In FIG. 2, arsenic contaminated water is conducted from an aquifer, well, or other water the water source and brought to ambient air pressure, as with the example shown in FIG. 1. In this attitude embodiment however solution is aerated but is not the pressurized. Rather, the solution is taken from ambient air pressure directly to negative pressurization below ambient pressure. By removing the step of pressurization, this alternative embodiment reduces the complexity of the method and apparatus required and may, in some circumstances therefore, the more practical for a desired use.

Figure 3:
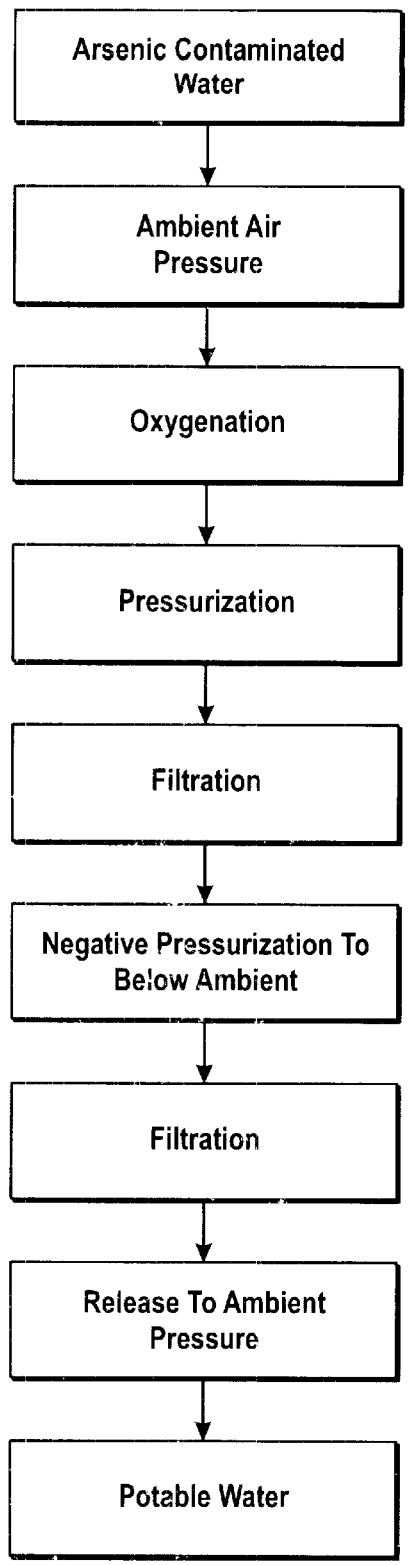
FIG. 3 is a flow chart showing the steps of another preferred method of the present invention.

FIG. 3 shows another embodiment of the present invention. In this method, the arsenic contaminated water is brought to ambient pressure and aerated. After the solution has been aerated, the solution is brought under pressure and filtered, as explained in the example illustrated in FIG. 1. However, in this embodiment, the solution is not taken from high pressure to ambient pressure but rather passes directly into the chamber where the solution is exposed to negative pressurization below ambient pressure. The dramatic change to negative pressure allows the arsenic to precipitate. It is believed that the arsenic more readily precipitates out of solution when the pressure around the solution changes because of the effect the pressure has onsolubility. The solid form of the arsenic is favored over the aqueous form when the solubility of the aqueous solution is so altered. After the solution is exposed to negative pressurization, the solution is filtered to remove the arsenic precipitate and released to ambient pressure.

In a preferred continuous, in-flow embodiment of an apparatus of the present invention, a continuous flow of contaminated aqueous solution enters a primary flow conduit, which may be a pipe, channel, or other device that carries the solution to an aeration or oxygenation area where air may be pumped into the solution or oxidants may be added thereto.

After aeration, the solution is pressurized to between about 10 psig to about 120 psig and preferably to between about 30 psig and about 40 psig. While this pressure level has proven to be adequate for inducing precipitation of As(III) and is easily achievable, lesser and greater pressures will prove adequate in many applications. Pressurization, in this embodiment, is achieved with a primary solution pump, which pumps the solution into a pressure vessel. The pressure vessel may be a holding tank designed to maintain pressure for a given period of time as the solution is pumped through the system or it may serve the purpose of surge protection or other capacity requirements. The pressure vessel may be a separate structure, such as a tank or other device that holds a large volume of solution or it may simply be a section of pipe or other pressure conduit which connects solution flow from the pump to a pressure regulator, such as a control valve.

The pressure regulator maintains sufficient pressure in the pressure vessel to promote precipitation of the arsenic species. The pressure regulator may be an electronically controlled valve or some other device that is capable of varying the flow, friction, or other characteristic to maintain pressure in the pressure vessel. The pressure regulator may be connected to sensors, which may signal and control the regulator or pump so as to maintain a given pressure, pressure range or pressure profile. The solution being treated may also be subjected to ultra violet radiation. This not only affects organic impurities, but has also been found to increase the precipitation of metals.

Once the precipitates have been separated the solution is further treated for arsenic contamination by placing the solution in a negative pressure chamber. The solution is then ready for further treatment of other kinds.

Figure 5:
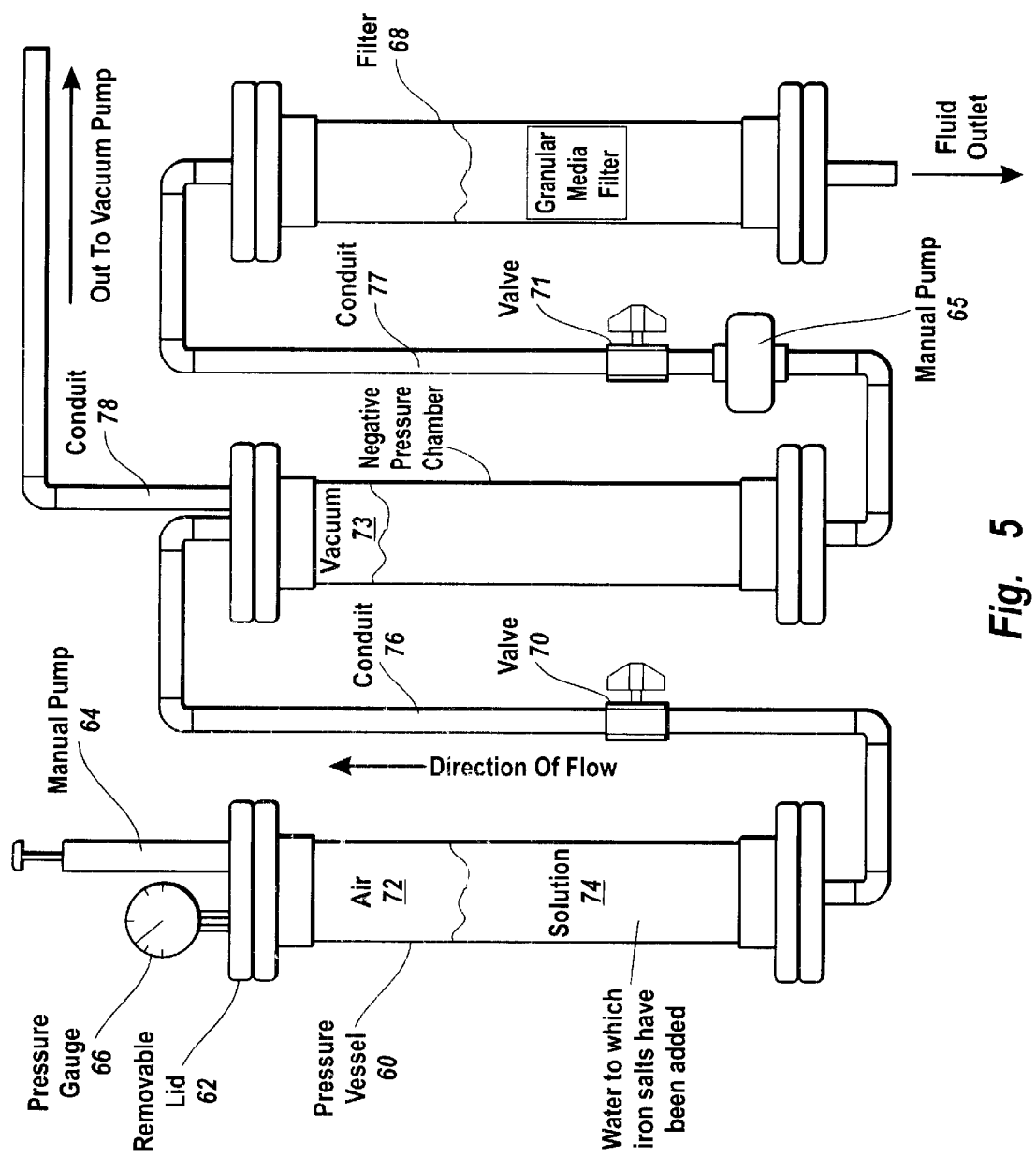
FIG. 5 illustrates a system for carrying out the present invention in a batch-process according to one embodiment of the present invention.

Another embodiment of the present invention, shown in FIG. 5, utilizes a batch-process method to treat contaminated solutions. This embodiment utilizes a pressure vessel 60 with a removable lid 62 which is removable for filling vessel 60. Lid 62 may be secured to vessel 60 so that vessel 60 may be pressurized during processes of the present invention. This embodiment also comprises pump 64, such as a hand pump, which may be used to pressurize vessel 60. A pressure gauge 66 may be used to monitor pressure in vessel 60 and to ensure that solution 74 has reached and maintained sufficient pressure to complete the process. Liquids may leave pressure vessel 60 through conduit 76 which connects vessel 60 to filter 68.

Filter 68 may be constructed in a variety of types which are capable of separating iron/arsenic precipitates from solution. Two-micron rated filters of the granular-media or pressure type have worked well in this application.

Valve 70 may be used to maintain pressure in vessel 60 and regulate flow of solution through filter 68 to the exterior of vessel 60. Valve 70 is not necessary for implementation of the present invention but adds convenience and functionality to some embodiments.

This batch-process embodiment of the present invention may be used by partially filling vessel 60 with an arsenic-contaminated solution 74. Sufficient air 72 is left in vessel 60 to properly aerate solution 74. Solution 74 may be aerated by shaking and swirling the solution while in vessel 60 or solution 74 may be aerated prior to filling vessel 60.

Once solution 74 has been aerated, solution 74 must be pressurized. This may be effectuated through the use of pump 64 which may be an attached hand pump or other means of pressurizing vessel 60. An independent compressor, bicycle pump, spare tire or other means of pressurization may also be used to pressurize the vessel of embodiments of the present invention. Pressurization may be verified by observation of gauge 66 which may be read visually or may be accompanied by an audible or visual alarm. Gauge 66 may also be an electronic or other automatic device which signals the user when the proper pressure level has been achieved and any necessary pressure retention period has lapsed.

Once the proper pressure requirements have been met, solution 74 may be allowed to exit vessel 60 through conduit 76 and through filter 68 which filters any precipitates and solids from solution 74. Valve 70 may be used to regulate flow from vessel 60. Valve 70 may be a hand operated valve which is used to manually control flow from vessel 60. Valve 70 may also be an automatic valve which may operate in conjunction with gauge 66. When the proper pressure and retention period are achieved, valve 70 may open automatically. Valve 70 may be used as a safeguard to ensure that proper pressurization has been achieved prior to exit of solution 74 from vessel 60.

The solution then passes immediately into a conduit through a metering valve which releases the solution into a negative pressure chamber. Upon reaching the negative pressure environment, the solution becomes gaseous and condenses on the sides of the chamber. During the rapid phase change, additional metals and impurities precipitate out of the solution and are collected and removed. The pressure is then increased to ambient and the solution returns to a liquid state and is then forwarded for further processing or use.

Any arsenic species present in solution 74 prior to treatment will be reduced to an almost imperceptible level which is well below current standards. Arsenic concentrations are successfully reduced to a level between about 1 ppb and about 5 ppb.

Further embodiments of the present invention may employ additional or alternative oxygenation techniques or other methods of promoting precipitation of arsenic species. Promoting precipitation of arsenic species may comprise increasing the rate of reaction as well as decreasing the final concentration of arsenic species in a solution. Another preferred embodiment of the present invention employs a step comprising injection of air or oxygen into the solution during a period of pressurization. This air injection step may be used in addition to aeration at ambient pressure to increase reaction rates further or may be used in place of aeration. Air injection during pressurization is typically accomplished using an air compressor and injection nozzles in a pressure vessel or conduit, however other methods may also be employed.

Yet another step may be used in embodiments of the present invention to promote arsenic precipitation. This step involves the addition of a chemical oxidant to the solution to be treated. Oxidant addition may take place before or during pressurization. Some chemical oxidants suitable for the methods of the present invention include, but are not limited to, hydrogen peroxide, ozone, chlorine, sodium hypochlorite, potassium hypochlorite, calcium hypochlorite, potassium permanganate and others. Addition of chemical oxidants to the solution may be performed in addition to aeration and/or air injection of the solution. Oxidant addition may also replace either or both of the aeration and air injection steps when conditions permit. For solutions with high arsenic concentrations and high concentration of As(III) a combination of ambient aeration, air injection, and addition of chemical oxidants may be required to achieve suitable reaction rates and final concentration levels. In-flow systems with high flow rates and limited reaction times may also require combinations of the above oxygenation steps for complete treatment.

In all parts of this document including the specification and claims, the term "oxygenation" shall comprise the processes of aeration, air injection and addition of chemical oxidants.

Another embodiment of the present invention comprises the steps of providing a solution to be treated at ambient conditions which include ambient pressure. The solution may naturally occur at ambient pressure, be transported to the treatment location at ambient pressure or may be transported through pressure piping after which it is allowed to return to ambient pressure.

The solution is then aerated using agitation, air nozzles or other means. Pressurization takes and after pressurization, or shortly thereafter, arsenic species will have precipitated from the solution and will exist as solids which can be separated from the solution. These precipitates are separated using techniques known in the industry. Known separation techniques include, but are not limited to, filtration, sedimentation, centrifugation and others. Separation may take place before or after the treated solution returns to ambient pressure. Once precipitates have been removed, the solution will have a reduced arsenic concentration.

The solution is then brought under negative pressure. Negative pressurization results in additional arsenic precipitation from the solution. The solution is brought back to ambient pressure. The additional precipitates are separated using techniques known in the industry and are separated before or after the treated solution returns to ambient pressure, as desired.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. A method of precipitating contaminants including arsenic from an aqueous solution comprising:

a) increasing the pressure of the solution from ambient pressure to a range from about 10 psig. to about 120 psig.;

b) injecting an effective amount of air into said solution to precipitate said contaminants; and c) decreasing the pressure to a negative atmospheric pressure in the range between about 0 in. Hg vacuum to about 20 in. Hg vacuum to precipitate said contaminants including said arsenic.

2. The method of claim 1, further comprising the step of exposing the solution to ultra violet radiation.

3. The method of claim 1, further comprising the step of oxygenating said solution.

4. The method of claim 1, comprising adding a chemical oxidant to said solution.

5. The method of claim 1, wherein the method is used in a batch process.

6. The method of claim 1 wherein the method is used in an in-stream process.

7. A method of precipitating as set forth in claim 6, wherein precipitated contaminants are removed from the solution after steps a and b.

8. A method of precipitating contaminants including arsenic from an aqueous solution in an in-stream process comprising:

a) injecting an effective amount of compressed air into a stream of said solution, to precipitate said contaminants and to increase pressure to a pressure greater than 10 psig, said compressed air creating a compressed stream of said solution;

b) rapidly transferring said compressed stream of said solution into a vacuum chamber having negative atmospheric pressure to precipitate said contaminants including said arsenic; and c) condensing and returning said compressed stream of said solution to ambient pressure.

9. A batch process method of precipitating contaminants including arsenic from an aqueous solution comprising:

a) filling a compression chamber with a quantity of said solution;

b) increasing the pressure within the chamber to a point above 10 psig, and adding an effective amount of air to precipitate said contaminants;

c) transferring the solution to a vacuum chamber having a negative atmospheric pressure to precipitate said contaminants including said arsenic; and d) returning the solution to ambient pressure.

* * * * *